Figure 13:
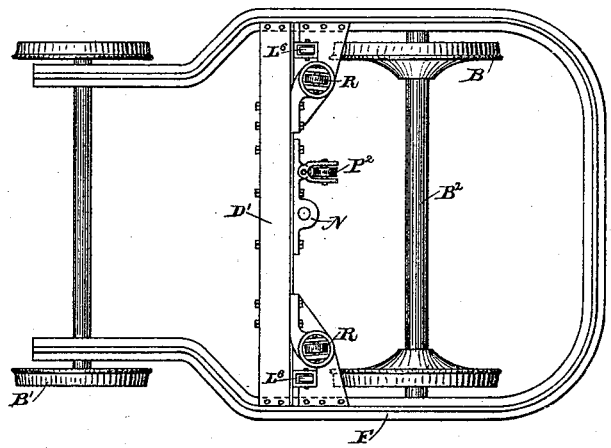

(No Model.)
3 Sheets—Sheet 1.
N. C. BASSETT.
CAR TRUCK.
No. 516,791.
Patented Mar. 20, 1894.
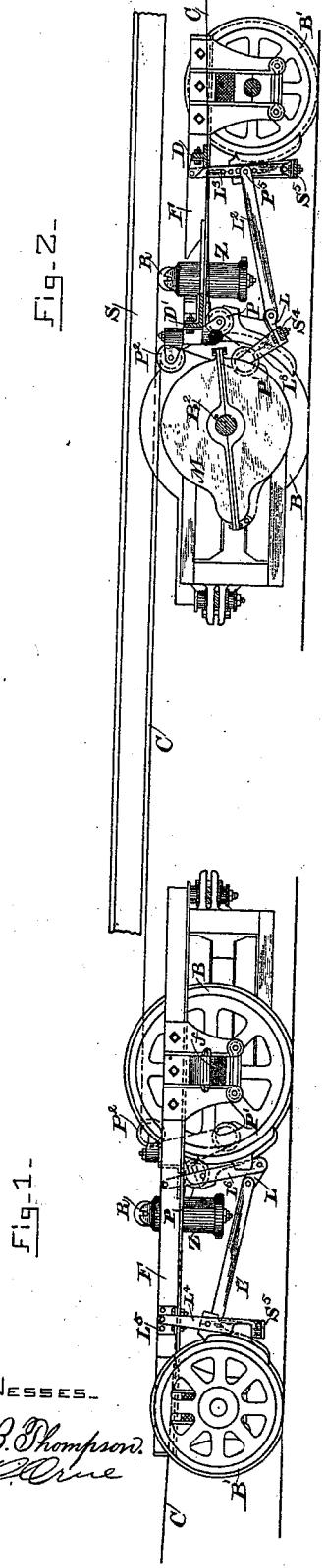
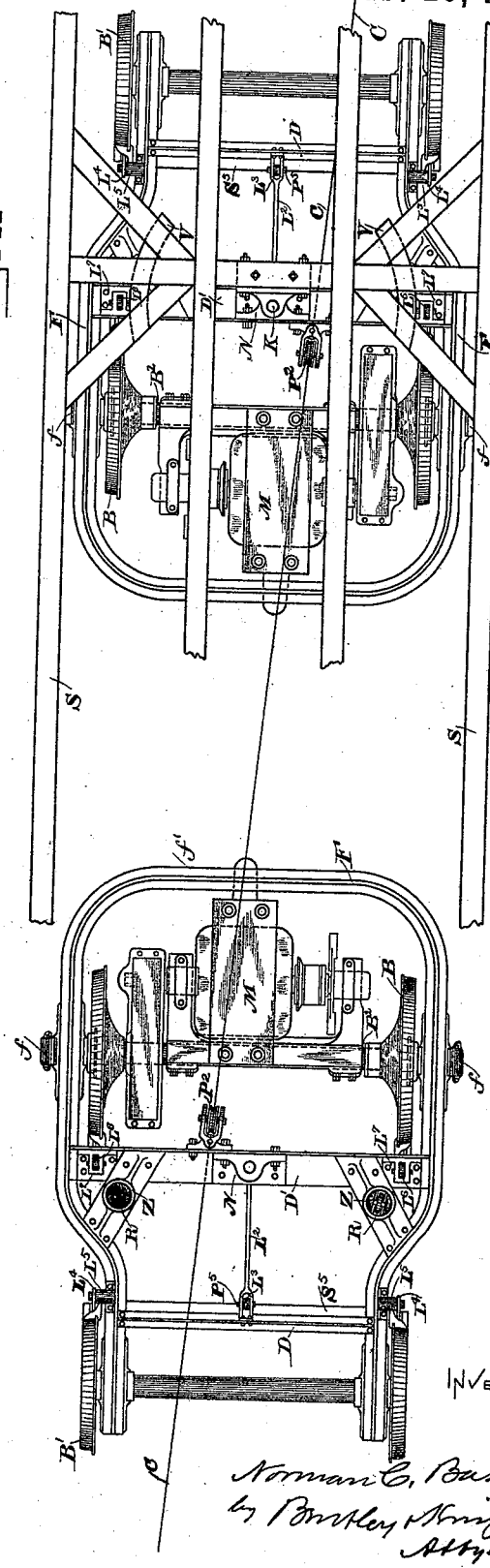
Witnesses—
S. B. Thompson
A. C. True
Inventor—
Norman C. Bassett
by Bakley & Knight
Attys.

(No Model.)  3 Sheets—Sheet 2.
N. C. BASSETT.
CAR TRUCK.
No. 516,791. Patented Mar. 20, 1894.
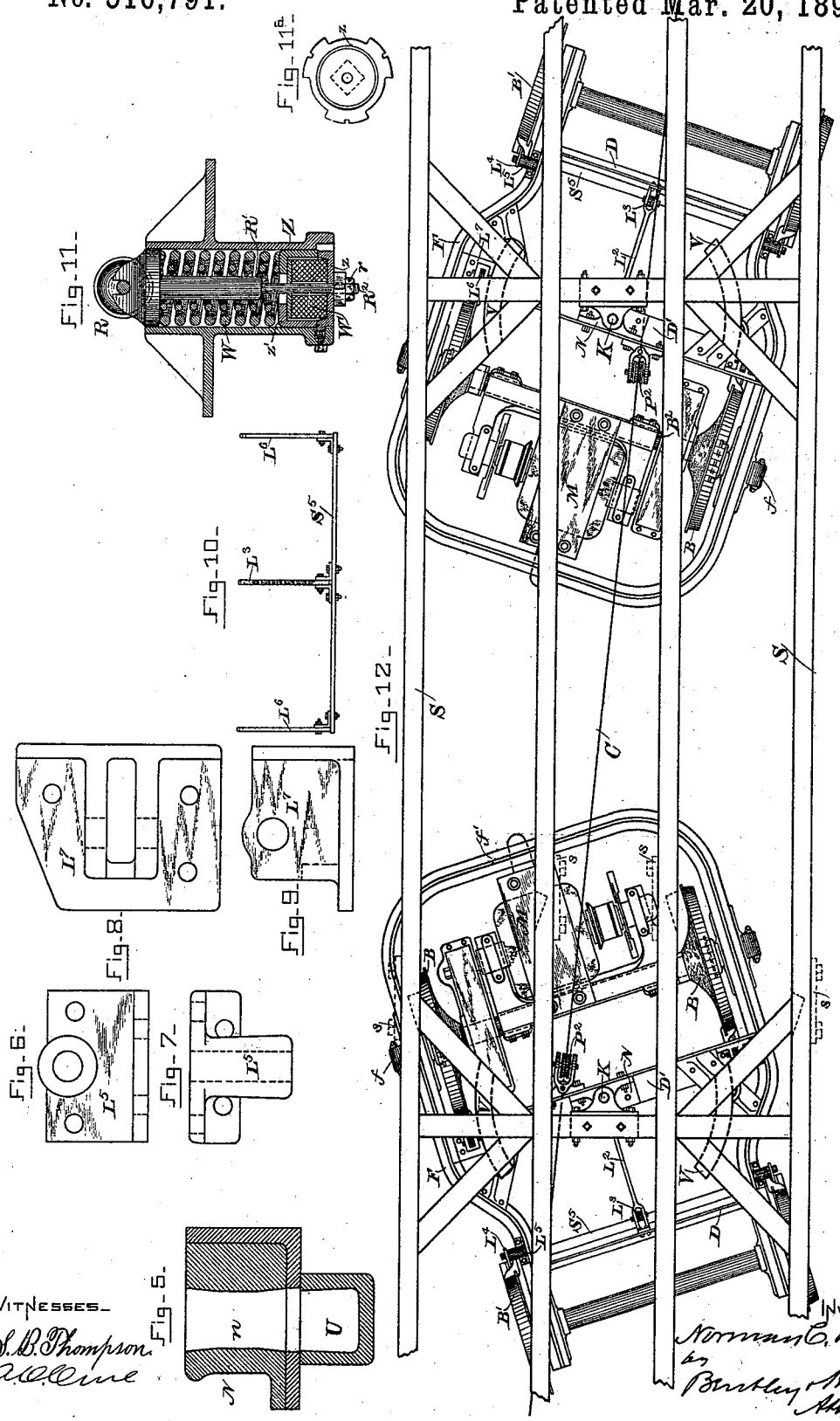
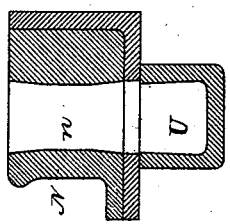
Witnesses—
S. B. Thompson
A. C. Cline
Inventor—
Norman C. Bassett
by Berkley & Knight
Attys (No Model.) 3 Sheets—Sheet 3.

N. C. BASSETT.
CAR TRUCK.

No. 516,791. Patented Mar. 20, 1894.

WITNESSES:

INVENTOR:
Norman C. Bassett
by Bentley Knight
ATTYS.

THE NATIONAL LITHOGRAPHING COMPANY,
WASHINGTON, D. C.

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

CAR-TRUCK.

SPECIFICATION forming part of Letters Patent No. 516,791, dated March 20, 1894.

Application filed June 5, 1891. Serial No. 395,275. (No model.)

*To all whom it may concern:*

Be it known that I, NORMAN C. BASSETT, a citizen of the United States, residing at Lynn, in the county of Essex and State of Massachusetts, have invented a certain new and useful Improvement in Railway-Car Trucks, of which the following is a specification.

My present invention relates to trucks for eight-wheel cars, more especially those used on electric or other street railways.

By means of my present improvements the car is enabled to take smaller curves than is usually possible with cars of the same drive-wheel diameter, and to do so without great friction or jar or disarrangement of the brake mechanism.

In the accompanying drawings, Figures 1 and 2 represent in side elevation and section respectively the two trucks of an eight-wheel car provided with my improvements. Figs. 3 and 4 are plans of the two trucks. Figs. 5, 6, 7, 8, 9, 10, 11 and 11$^a$ show details. Fig. 12 shows the two trucks on a curve. Fig. 13 represents a truck with the preferred arrangement of the side bearings for the car body.

The trucks are of that form in which there is one driving and one idle axle, and the center plate on which the car body is swiveled, is eccentric to the wheel base, being nearer to the driving than to the idle axle, and the driving wheels being made larger than the idle wheels. The large drive wheel is considered desirable, and this construction enables such wheels to be used, without interference with the car body frame in rounding curves, as, on account of the eccentric pivot, the large wheels are but slightly displaced, see Fig. 12. The small wheels, on the other hand, are considerably displaced, but are small enough to pass freely under the car sills.

The truck frame F embraces the large driving wheels B, being provided with outside boxes $f$, for the axle thereof, and with a bridging end portion $f'$. The other end of the frame, however, is brought within or between the small wheels B', and is provided with inside boxes for the other axle. This gives a wide span bearing for the driving axle, and free space for the motor between the drive wheels, while preventing objectionable protrusion of the small wheel end of the frame, in rounding curves. This is especially advantageous with open cars, as the frame is thereby prevented from striking the side steps. In case the large wheels B, B, are found to strike the sills in a curve, the sills may be cut away and reinforced as indicated in dotted lines at $s$, Fig. 12. Center plate N is borne by the bolster D' and the cross-beam D completes the frame at the trailing axle end.

This truck is especially intended for electric railway cars, the motor M being journaled on and geared to the driving axle B$^2$, and being wholly outside the wheel-base, its other end being supported by the bridging end portion $f'$ of the truck frame.

The car body frame S is swiveled or pivoted on the trucks by center or pivot plate N receiving king bolt K. As shown in Fig. 5 the pivot hole $n$ flares upwardly and downwardly from the center, so as to allow of some rocking of the car body without straining the king pin. A cup U is placed below this pivot hole, closing the same against dust, and catching drippings of lubricant from the king bolt. To ease off the violent rocking and jar on rounding curves, I employ yielding side bearings, which take substantially the whole weight of the car, and are preferably provided with anti-friction rolls to enable easy turning of the car on the truck. These bearings consist of a track or bearing-plate V on the car body and a roll-bearing R supported by a spring W in a box Z on the truck frame.

By reference to Figs. 11 and 11$^a$, it will be seen that the lower end of the spring box Z is closed by a bottom plate $z$ which is adapted to be inserted in the box, engaging with catches therein and locked against displacement. By removing this bottom plate the spring may be taken out without lifting the car body. A rubber cushion W' supported by plate $z$ is arranged to receive the impact of a shoulder R' on the spindle R$^2$ of the roll-support. A bridge $z'$ supports the spring W directly from the bottom plate, so that no strain is normally brought on the rubber cushion, but when the car lurches violently to one side, the shoulder R' is brought down against this cushion, which thus constitutes a deadening stop. The lower end of the spindle R² has a nut r engaging thereon whereby the parts are held together, and may be removed as a whole from or replaced in the box, with the springs under tension.

While I have shown the side bearings R on the truck, between the line of the king bolt and the idle axle, I prefer, in many cases, to place it between the said pivot line and the driving axle, so as to bring more of the weight on the driving axle, than were the bearings in line with the pivot when the latter is in the position to produce the desired relative movements of the axles. The truck as thus constructed is shown in Fig. 13.

Further improvements relate to the brake mechanism, enabling it to work with equal facility on straight tracks and curves. For this purpose the brake cable or chain C is carried over pulleys P, P² swiveled in the truck frame and leading the cable to the pulley P' on the brake lever arm S⁵. The swiveled or swinging pulleys P, P² are placed near the pivot plate and on opposite sides thereof on the two trucks so that in rounding a curve (see Fig. 12) there is no pulling of the cable, and the swinging pulleys prevent binding and allow perfect freedom of movement when the brakes are to be set on a curve.

The brake shoe hangers L⁴ for the trailing axle, are hung from castings L⁵ on the outside of the frame F shown in detail in Figs. 6 and 7 while the hangers L⁶ for the driving wheel brake shoes, are suspended from castings L⁷ (see Figs. 8 and 9) on the bolster D'. The brake shoe beams S⁵ and S⁴ for the respective axles are connected together by toggle levers L, L². The lever L² is attached to brake beam S⁵ for the small wheel axle by an adjustable leverage device, being secured by pin P⁵ at any desired point on lever L³, hung from cross-beam D and attached to brake beam S⁵. For facilitating adjustment the lever L³ may have a series of holes as shown in Figs. 2 and 10, to receive the pin P⁵. An arm L⁸ on brake shoe beam S⁴, carries the pulley P' over which the brake cable passes. To set the brakes the cable is pulled from either end, drawing up pulley P', straightening toggle L, L², forcing the brake beams apart, and causing the brake shoes to bear on their respective wheels, the pressure on the idle or trailing wheels being less than on the driving or loaded wheels in any desired proportion.

What I claim as new, and desire to secure by Letters Patent, is—

1. A railway car truck having a driving axle and an idle axle, a center bearing for the car body located near the driving axle and side bearings for the car body located between the line of the center plate and the driving axle.

2. The side bearings interposed between a car body and its truck and having a spring support and a cushioned stop.

3. The side bearings for supporting a car body, comprising a bearing surface, a spring support for such surface, and a support for such spring removable and insertible from below.

4. The side bearing comprising a bearing surface, a spring support therefor, a support for such spring, removable and insertable from below, and a retaining device for retaining said support in position.

5. The side bearing having a bearing surface, a spring support therefor, a containing holder for such spring, and a support for said spring removable independently of such holder.

6. The combination with the two pivoted trucks of an eight wheel car, each provided with brake levers, a cable having drawing connections with said brake levers and pulleys swiveled in the truck frames and carrying the cable.

7. The combination with the pivoted truck, the brake lever carrying a pulley and brake cable passing over said pulley, of the two pulleys swiveled to the truck for leading the cable to the brake lever pulley.

8. The combination with a car truck having driving and idle axles, of a brake mechanism connected with different leverage to the two brake beams, as and for the purpose set forth.

9. The combination with a car truck having driving and driven wheels, of brake mechanism connected with different leverage to the two brake beams, one of such brake connections being adjustable.

10. A railway car truck having a driving axle and an idle axle, a center bearing for the car body located nearer the driving axle than the idle axle, and side bearings for the car body located between the line of the center plate and one of the axles.

In witness whereof I have hereunto set my hand this 23d day of May, 1891.

NORMAN C. BASSETT.

Witnesses:
JOHN W. GIBBONEY,
BENJAMIN B. HULL.